United States Patent
Shimizu et al.

(10) Patent No.: US 10,132,960 B2
(45) Date of Patent: Nov. 20, 2018

(54) BALLOONSONDE CANISTER AND BALLOONSONDE CANISTER MODULE

(71) Applicants: MEISEI ELECTRIC CO., LTD., Isesaki-shi, Gunma (JP); IHI AEROSPACE ENGINEERING CO., LTD., Tomioka-shi, Gunma (JP)

(72) Inventors: Kensaku Shimizu, Isesaki (JP); Yasomi Oike, Isesaki (JP); Hirotake Morisaki, Tomioka (JP); Tomohiko Naide, Tomioka (JP)

(73) Assignees: MEISEI ELECTRIC CO., LTD., Isesaki-shi, Gunma (JP); IHI AEROSPACE ENGINEERING CO., LTD., Tomioka-shi, Gunma (JP)

( * ) Notice: Subject to any disclaimer, the term of this patent is extended or adjusted under 35 U.S.C. 154(b) by 0 days.

(21) Appl. No.: 15/507,562

(22) PCT Filed: Jan. 19, 2016

(86) PCT No.: PCT/JP2016/000239
§ 371 (c)(1),
(2) Date: Feb. 28, 2017

(87) PCT Pub. No.: WO2017/125962
PCT Pub. Date: Jul. 27, 2017

(65) Prior Publication Data
US 2018/0239056 A1 Aug. 23, 2018

(51) Int. Cl.
*G01W 1/00* (2006.01)
*G01W 1/08* (2006.01)
(52) U.S. Cl.
CPC ..................... *G01W 1/08* (2013.01)
(58) Field of Classification Search
CPC ........................................................ G01W 1/08
(Continued)

(56) References Cited

U.S. PATENT DOCUMENTS 4,899,583 A * 2/1990 Booker ............... B64D 1/02
73/170.28
5,850,987 A 12/1998 Aurilio et al.
(Continued)

FOREIGN PATENT DOCUMENTS

JP 2005-180987 A 7/2005
JP 2006-038725 A 2/2006

OTHER PUBLICATIONS

PCT International Search Report of PCT/JP2016/000239 "PCT/ISA/237 & PCT/ISA/210" in Japanese, pp. 3.
(Continued)

*Primary Examiner* — Lisa Caputo
*Assistant Examiner* — Roger Hernandez-Prewit
(74) *Attorney, Agent, or Firm* — Manabu Kanesaka (57) ABSTRACT

A canister for housing a balloon and a radiosonde to be released into the atmosphere includes a case, a balloon detaching mechanism, and a gas passage. The case includes first to third housing chambers arranged side by side in a horizontal direction. The first to third housing chambers are in communication with one another in an upper part of the case. The balloon detaching mechanism is connected to the balloon and is configured to detach the balloon when the balloon is released. The gas passage introduces a gas into the balloon to inflate the balloon. The balloon detaching mechanism and the gas passage are housed in the second housing chamber disposed between the first housing chamber and the third housing chamber. The first housing chamber houses the radiosonde connected to the balloon via a rope. The third housing chamber houses part of the balloon connected to the balloon detaching mechanism.

7 Claims, 10 Drawing Sheets

(58) Field of Classification Search
USPC .............................. 73/170.28; 244/1 TD, 31
See application file for complete search history.

(56) References Cited

U.S. PATENT DOCUMENTS

| | | | | |
|---|---|---|---|---|
| 5,884,862 A | * | 3/1999 | Aurilio et al. ............ | B64B 1/40 244/1 TD |
| 2005/0006523 A1 | * | 1/2005 | French et al. .......... | G01W 1/08 244/31 |

OTHER PUBLICATIONS

PCT/ISA/237, "Written Opinion of the International Searching Authority for International Application No. PCT/JP2016/00239," dated Apr. 12, 2016, pp. 5.

\* cited by examiner

BALLOONSONDE CANISTER AND BALLOONSONDE CANISTER MODULE

RELATED APPLICATIONS

The present application is National Phase of International Application No. PCT/JP2016/000239 filed Jan. 19, 2016, the disclosure of which is hereby incorporated by reference herein in its entirety.

TECHNICAL FIELD

The present invention relates to a canister for housing a balloon and a radiosonde and a canister module including a plurality of canisters.

BACKGROUND ART

A balloon-launching device described in Patent Literature 1 includes a turntable that turns in a horizontal plane. A plurality of trays are disposed on the turntable and are arranged in the circumferential direction of the turntable. A balloon and a radiosonde connected to the balloon are placed on each of the trays. The balloons and the radiosondes placed on the respective trays can be sequentially released by turning the turntable.

CITATION LIST

Patent Literature

Patent Literature 1: Japanese Patent Laid-Open No. 2006-038725

SUMMARY OF INVENTION

Technical Problem

The present invention provides a canister configured to house a radiosonde and balloon, the canister having a structure different from the balloon-launching device described in Patent Literature 1. The present invention also provides a canister module constituted by a plurality of canisters.

Solution to Problem

The present invention is a canister configured to house a balloon and a radiosonde to be released into the atmosphere. The canister includes a case, a balloon detaching mechanism, and a gas passage. The case includes a first housing chamber, a second housing chamber, and a third housing chamber arranged side by side in a horizontal direction. The first housing chamber, the second housing chamber, and the third housing chamber are in communication with one another in an upper part of the case. The balloon detaching mechanism is connected to the balloon and is configured to detach the balloon when the balloon is released. The gas passage is configured to introduce a gas into the balloon to inflate the balloon.

The balloon detaching mechanism and the gas passage are housed in the second housing chamber. The second housing chamber is disposed between the first housing chamber and the third housing chamber. The first housing chamber houses the radiosonde connected to the balloon via a rope. The third housing chamber houses part of the balloon connected to the balloon detaching mechanism.

The present invention enables the balloon and the radiosonde to be released into the atmosphere simply by placing the canister. Thus, there is no need to place the turntable described in Patent Literature 1.

Moreover, the first housing chamber and the second housing chamber are adjacent to each other in the present invention. Thus, the radiosonde housed in the first housing chamber is disposed at a position adjacent to the balloon detaching mechanism and the gas passage housed in the second housing chamber. This allows the balloon to ascend at a position close to the radiosonde when the balloon is detached from the balloon detaching mechanism to ascend. Therefore, the radiosonde can smoothly move upwardly from the first housing chamber in the ascending of the balloon.

If the position at which the balloon starts to ascend is distant from the radiosonde, the radiosonde is pulled in a direction different from the upward direction (i.e., the direction where the balloon is located) in the ascending of the balloon. It is therefore difficult for the radiosonde to smoothly move upwardly. The present invention facilitates the transmission of force generated by the ascending of the balloon (force heading upwardly) to the radiosonde, and the radiosonde can thus smoothly move upwardly.

Furthermore, the balloon is housed in the third housing chamber separated from the second housing chamber in the present invention. This can prevent the balloon from interfering with the balloon detaching mechanism and the gas passage housed in the second housing chamber when the balloon is inflated.

The part of the balloon is housed from an upper part of the third housing chamber toward a lower part thereof. Here, the part of the balloon housed in the third housing chamber can be folded in a vertical direction. When a gas from the gas passage is filled into the balloon, the balloon inflates and ascends. Since the balloon is housed in the folded state from the upper part of the third housing chamber toward the lower part thereof, the balloon can start to inflate from a portion located in the upper part of the third housing chamber. The balloon can thus ascend smoothly.

If the balloon started to inflate from a portion located in the lower part of the third housing chamber, the inflated portion would be in intimate contact with the third housing chamber, failing to elevate the balloon. If the balloon starts to inflate from the portion located in the upper part of the third housing chamber as in the present invention, the inflated portion can be prevented from being in intimate contact with the third housing chamber. The balloon can thus ascend smoothly.

The gas passage includes a coupler. The coupler can be connected to a mouthpiece provided in a mouth of the balloon and includes a movable member. The movable member is configured to move between a connected position for connecting the mouthpiece to the coupler and a released position for releasing the connection between the mouthpiece and the coupler. The balloon detaching mechanism includes a linkage member connected to the movable member of the coupler. The linkage member is configured to move the movable member between the connected position and the released position. The balloon can be detached from the balloon detaching mechanism by driving the linkage member.

The case can be constituted by a case main body and a cover. The case main body forms the first housing chamber, the second housing chamber, and the third housing chamber. The cover opens and closes an opening formed in an upper part of the case main body. If not releasing the balloon and radiosonde into the atmosphere, the cover is closed. It is able to prevent foreign objects, or the like, from entering into the case main body.

The second housing chamber can house a cover opening and closing mechanism for opening and closing the cover. The cover opening and closing mechanism can be constituted by a rod connected to the cover and an actuator configured to move the rod in the vertical direction. The cover can be opened by driving the actuator to move the rod upwardly. In contrast, the cover can be closed by driving the actuator to move the rod downwardly.

An inner wall surface of the first housing chamber can be provided with a guide portion configured to extend in the vertical direction for guiding the ascending of the radiosonde. This allows the radiosonde to move along the guide portion, and the radiosonde can thus ascend smoothly. Moreover, the positioning of the radiosonde can be achieved in the first housing chamber by making the guide portion in contact with the radiosonde when the radiosonde is housed in the first housing chamber.

A canister module can be formed by preparing a plurality of canisters of the present invention. Here, the plurality of canisters can be arranged within a horizontal plane. In the canister module of the present invention, the plurality of canisters can be disposed together. Thus, the creation of dead space can be reduced as compared to the turntable described in Patent Literature 1.

DESCRIPTION OF EMBODIMENTS

Embodiments of the present invention will be described. A canister of this embodiment houses a balloon and a sonde attached to the balloon.

Figure 1:
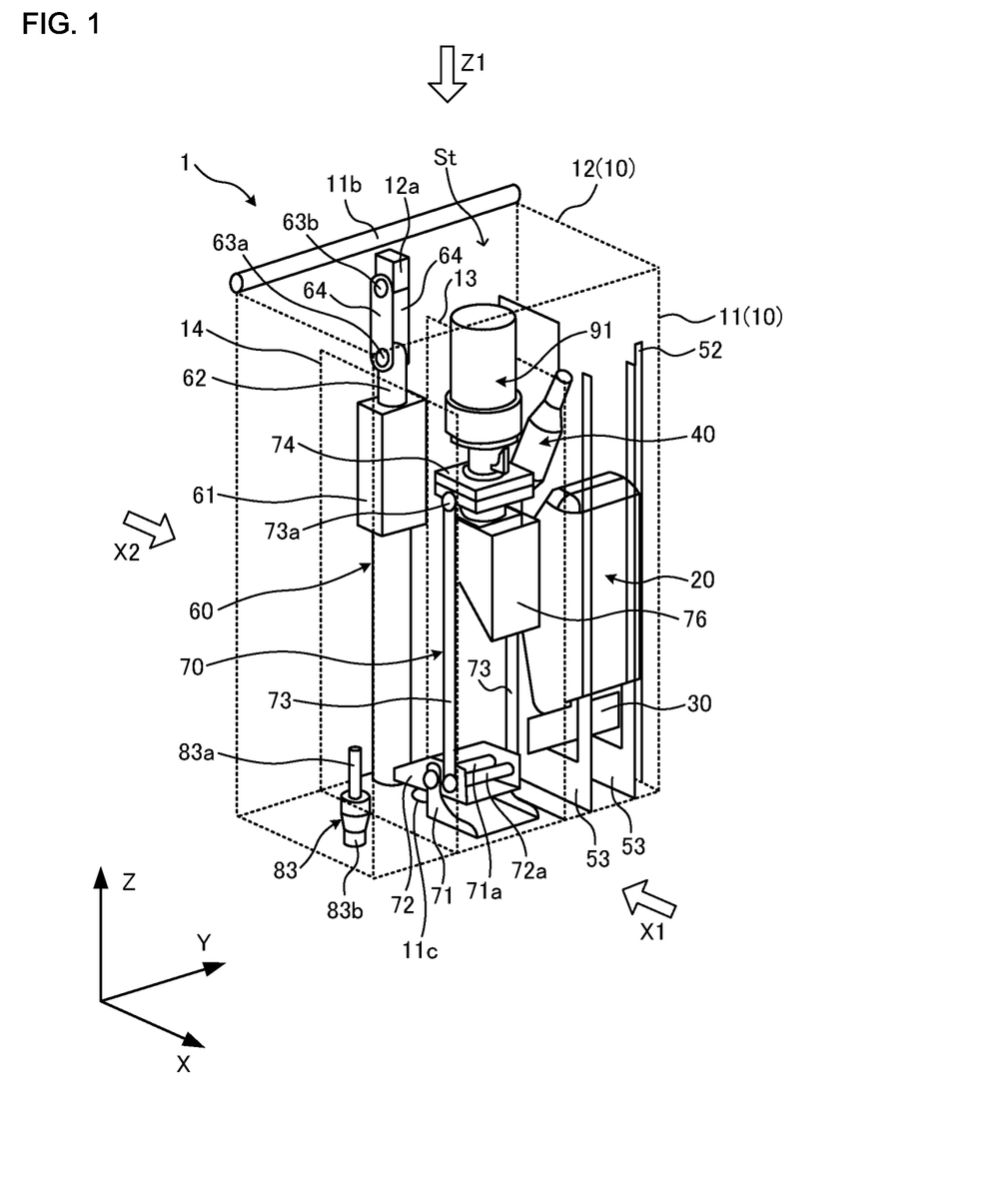
FIG. 1 is a perspective view illustrating an internal structure of a canister.

FIG. 1 is a perspective view illustrating an internal structure of the canister. An X-axis, a Y-axis, and a Z-axis in FIG. 1 are axes orthogonal to one another. In this embodiment, the Z-axis is an axis extending in the vertical direction. An X-Y plane corresponds to the horizontal plane. The relationships among the X-axis, the Y-axis, and the Z-axis also apply to the other drawings.

Figure 2:
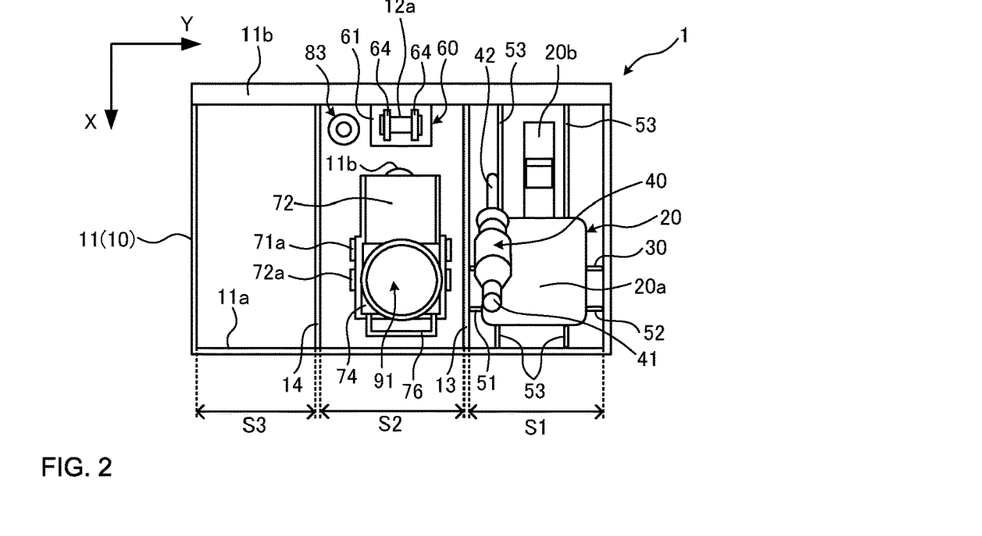
FIG. 2 is a top view of the canister.
Figure 3:
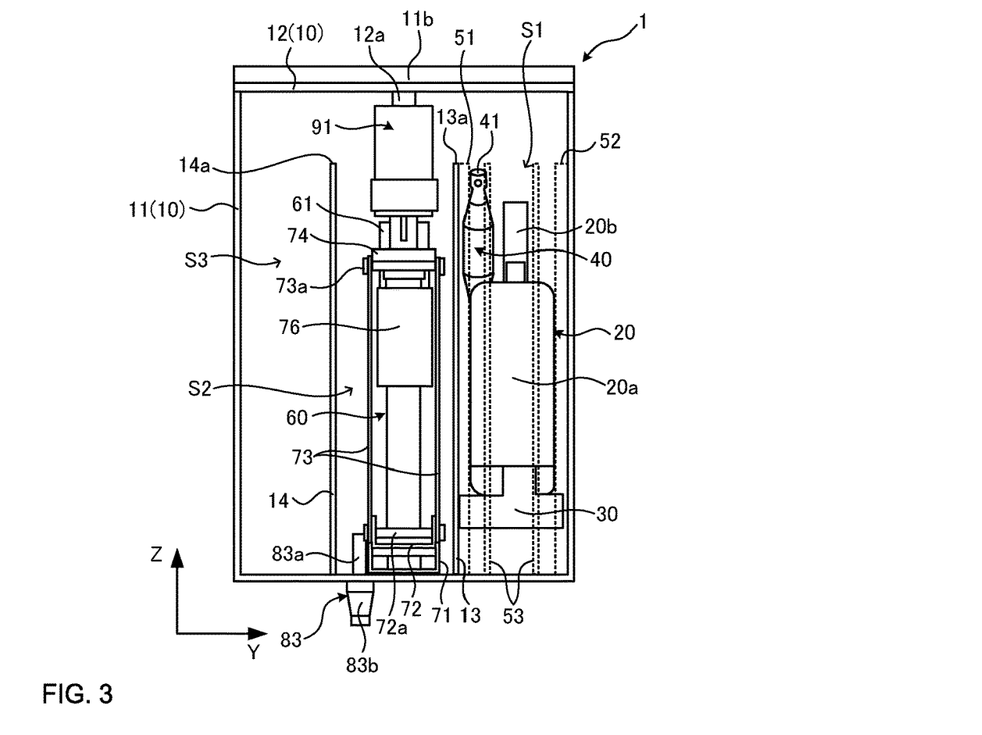
FIG. 3 is a front view of the canister.
Figure 4:
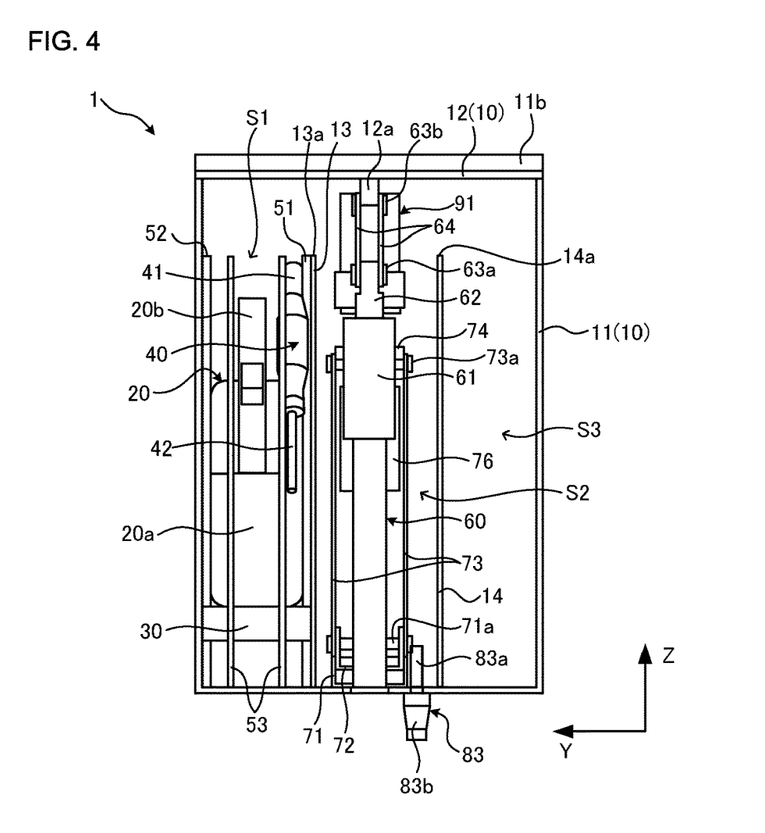
FIG. 4 is a rear view of the canister.

FIG. 2 is a diagram (top view) of the canister as viewed in the direction of an arrow Z1 shown in FIG. 1. FIG. 3 is a diagram (front view) of the canister as viewed in the direction of an arrow X1 shown in FIG. 1. FIG. 4 is a diagram (rear view) of the canister as viewed in the direction of an arrow X2 shown in FIG. 1.

The canister 1 includes a case 10. The case 10 includes a case main body 11 and a cover 12. As shown in FIG. 2, an opening 11a is formed in the upper surface of the case main body 11, and the cover 12 opens and closes the opening 11a. An axial member 11b is disposed along one side (the side extending in the Y direction) of the opening 11a and fixed to the case main body 11. The cover 12 is rotatably attached to the axial member 11b and rotates about the axial member 11b.

Although the cover 12 is provided in this embodiment, the cover 12 may be omitted. Note however that such provision of the cover 12 as in this embodiment can prevent foreign objects, or the like, from entering into the case main body 11.

A first partition plate 13 and a second partition plate 14 are disposed inside the case main body 11. The first partition plate 13 and the second partition plate 14 are disposed along the X-Z plane and arranged side by side in the Y direction. The first partition plate 13 and the second partition plate 14 divide a housing chamber St formed inside the case main body 11 into three housing chambers (a first housing chamber S1, a second housing chamber S2, and a third housing chamber S3).

The first housing chamber S1 is a space surrounded by the case main body 11 and the first partition plate 13. The second housing chamber S2 is a space surrounded by the case main body 11, the first partition plate 13, and the second partition plate 14. The second housing chamber S2 is formed between the first partition plate 13 and the second partition plate 14. The third housing chamber S3 is a space surrounded by the case main body 11 and the second partition plate 14. In this embodiment, the first housing chamber S1, the second housing chamber S2, and the third housing chamber S3 are arranged side by side in the Y direction, and the second housing chamber S2 is positioned between the first housing chamber S1 and the third housing chamber S3.

An upper end 13a (see FIGS. 3 and 4, for example) of the first partition plate 13 is separated from the cover 12. An outer edge of the first partition plate 13, except for the upper end 13a, is in contact with an inner wall surface of the case main body 11. An upper end 14a (see FIGS. 3 and 4, for example) of the second partition plate 14 is separated from the cover 12. An outer edge of the second partition plate 14, except for the upper end 14a, is in contact with the inner wall surface of the case main body 11. Due to the upper ends 13a and 14a being separated from the cover 12, the first housing chamber S1, the second housing chamber S2, and the third housing chamber S3 are in communication with one another in an upper part of the case main body 11.

The case main body 11, the first partition plate 13, and the second partition plate 14 can be formed by separate members, and the first partition plate 13 and the second partition plate 14 can be fixed to the case main body 11. Alternatively, at least one of the first partition plate 13 and the second partition plate 14 may be integrally formed with the case main body 11.

An internal structure of the first housing chamber S1 will be described next. The first housing chamber S1 houses a radiosonde 20, an activation board 30, and a lowering device 40. First, a configuration of the radiosonde 20 will be described.

Figure 5:
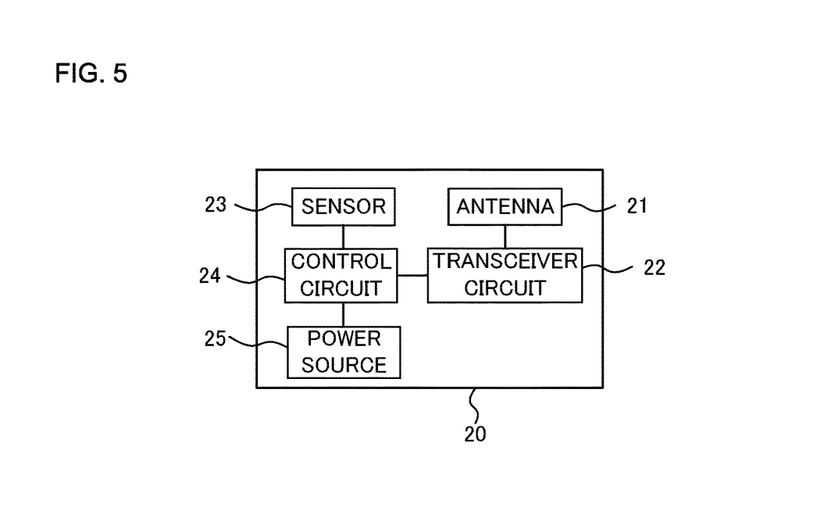
FIG. 5 is a diagram showing a circuit configuration of a radiosonde.

As shown in FIG. 5, the radiosonde 20 includes an antenna 21, a transceiver circuit 22, a sensor 23, a control circuit 24, and a power source 25. The antenna 21 is configured to receive radio signals from a ground-based transmitter and is configured to transmit radio signals to a ground-based receiver. The transceiver circuit 22 is configured to control the transmitting and receiving of radio signals via the antenna 21.

The sensor 23 is configured to detect information about the atmosphere. Examples of information about the atmosphere may include atmospheric pressure, atmospheric temperature, humidity, wind direction, wind speed, radiation, ozone concentration, aerosol such as dust, and potential difference in the atmosphere. The sensor 23 is selected in accordance with a subject to be detected. The control circuit 24 is configured to control operations of the transceiver circuit 22. For example, the control circuit 24 can control the transceiver circuit 22 to transmit information detected by the sensor 23 from the antenna 21. The power source 25 is configured to supply power to the transceiver circuit 22, the sensor 23, and the control circuit 24.

As shown in FIG. 2, for example, the radiosonde 20 includes a sonde main body 20a and a sensor holder 20b. The sonde main body 20a houses the transceiver circuit 22, the control circuit 24, and the power source 25 shown in FIG. 5. In order to reduce the weight of the radiosonde 20, the sonde main body 20a may be made of styrene foam or plastic, for example. The antenna 21 shown in FIG. 5 projects outward from the sonde main body 20a.

The sensor holder 20b projects outward from the sonde main body 20a, and the sensor 23 shown in FIG. 5 is attached to the sensor holder 20b. Note that the sensor 23 may be attached to the sonde main body 20a depending on the type of the sensor 23. The sensor holder 20b is an elongated member and capable of easily bending.

The activation board 30 is fixed to the first housing chamber S1 (i.e., the case main body 11 and the first partition plate 13). The activation board 30 is connected to a control device (not shown) provided outside the canister 1 via wiring (not shown). The activation board 30 activates the radiosonde 20 in response to a control signal received from the control device. Through wired or wireless connection between the activation board 30 and the radiosonde 20, the radiosonde 20 can be activated by an activation signal output from the activation board 30. The activation of the radiosonde 20 causes power from the power source 25 to be supplied to the control circuit 24, etc., as shown in FIG. 5.

A notch (not shown) extending in the Z direction is formed in the bottom of the sonde main body 20a, and the activation board 30 is inserted into the notch. Due to part of the activation board 30 being inserted into the notch of the sonde main body 20a, the activation board 30 can communicate with the control circuit 24 in the sonde main body 20a. The activation board 30 is slidably attached to the sonde main body 20a. This allows the sonde main body 20a to ascend while sliding against the activation board 30 when the radiosonde 20 is released into the atmosphere as will be described later.

An inner wall surface of the first housing chamber S1 is provided with guide ribs 51 and 52 projecting toward the inner side of the first housing chamber S1. The guide rib 51 is formed on the first partition plate 13 and extends in the Z direction. The guide rib 52 is formed on a side surface of the case main body 11 facing the first partition plate 13 in the Y direction and extends in the Z direction. Tips of the guide ribs 51 and 52 are in contact with the outer surface of the sonde main body 20a, thus positioning the radiosonde 20 in the Y direction.

Figure 6:
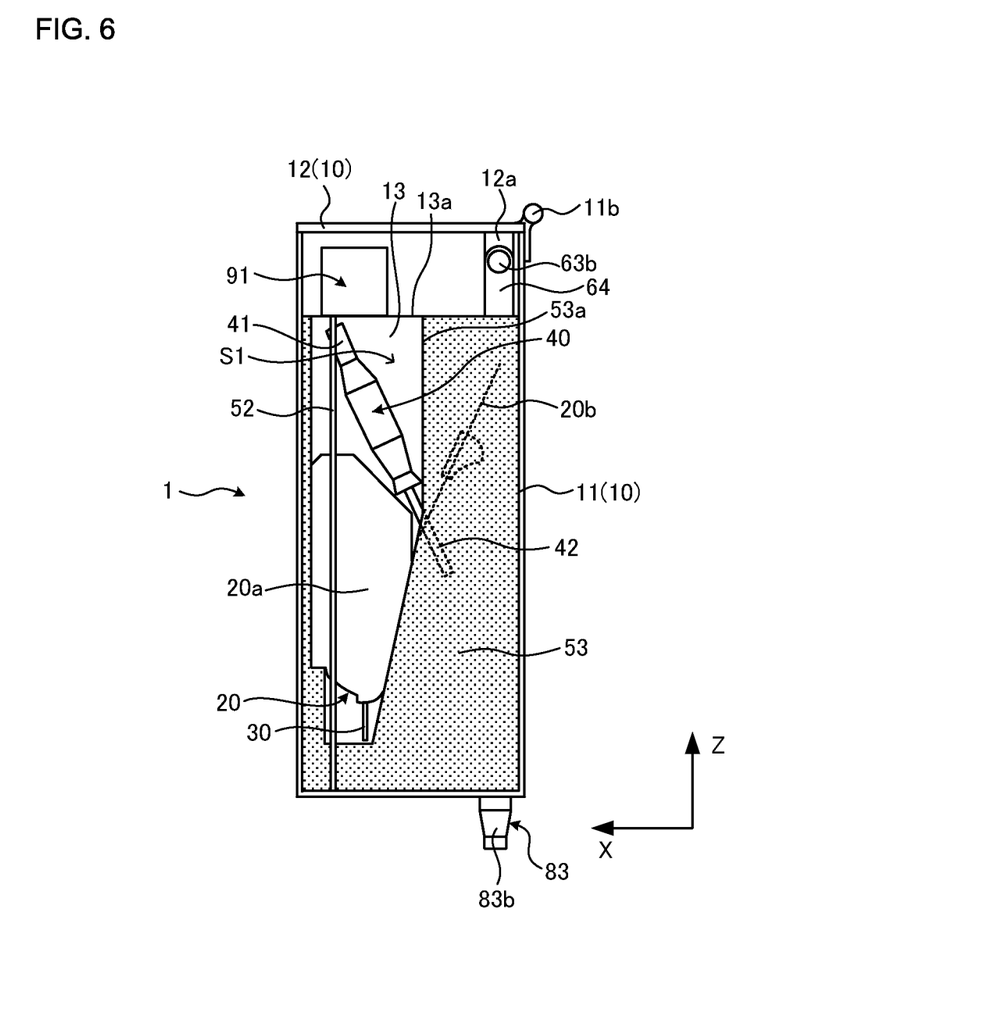
FIG. 6 is a side view of a first housing chamber.

A pair of guide plates 53 are disposed in the first housing chamber S1. The guide plates 53 are disposed along the X-Z plane, and the pair of guide plates 53 are arranged side by side in the Y direction. As shown in FIG. 6, the guide plate 53 includes a notch 53a. FIG. 6 is a diagram (side view) of the first housing chamber S1 as viewed in the Y direction. In other words, FIG. 6 is a diagram of the first housing chamber S1 as viewed from the case main body 11 side toward the first partition plate 13 side.

As shown in FIG. 6, part of the notch 53a is formed along the outer surface of the sonde main body 20a and is in contact with the sonde main body 20a. The notch 53a interposes the sonde main body 20a in the X direction, thus positioning the radiosonde 20 in the X direction. When the radiosonde 20 is released into the atmosphere, the sonde main body 20a ascends along the notch 53a.

As shown in FIG. 2, for example, the sensor holder 20b is disposed between the pair of guide plates 53. Accordingly, the sensor holder 20b moves between the pair of guide plates 53 when the radiosonde 20 is released into the atmosphere, thus preventing its interference with the guide plates 53. The provision of the pair of guide plates 53 enables the stable support of the sonde main body 20a. Note that the number of the guide plates 53 can be appropriately determined. Only one guide plate 53 may be provided, for example.

In this embodiment, the positioning of the sonde main body 20a in the X-Y plane can be achieved by bringing the guide ribs 51 and 52 and the notches 53a of the guide plates 53 into contact with the sonde main body 20a. Moreover, the sonde main body 20a can move along the guide ribs 51 and 52 and the notches 53a, thereby allowing the sonde main body 20a to smoothly ascend when the radiosonde 20 is released into the atmosphere.

A structure of the lowering device 40 will be described next.

A rope (not shown) for hanging the radiosonde 20 from the balloon is wound around the lowering device 40. One end of the rope is fixed to the balloon, and the other end of the rope is fixed to the radiosonde 20. One end of the lowering device 40 is provided with a fastening portion 41 for fastening the rope. One end of the rope extending from the fastening portion 41 is fixed to the balloon. The other end side of the rope extending from the fastening portion 41 is wound around an outer periphery of the lowering device 40, and the other end of the rope is fixed to the radiosonde 20. For example, the other end side of the rope may be wound around and fixed to the radiosonde 20.

The other end of the lowering device 40 is provided with a delay portion 42, and the rope is also wound around the delay portion 42. While the rope wound around the lowering device 40 is unwound when the balloon ascends, the delay portion 42 delays the speed at which the rope is unwound. The delay portion 42 can be made of a rubber tube, for example, and frictional resistance between the delay portion 42 and the rope can delay the speed at which the rope is unwound.

The use of the lowering device 40 allows a distance between the balloon and the radiosonde 20 to change after the launch of the balloon. More specifically, when the altitude of the balloon (distance from the ground to the balloon) is lower than a predetermined altitude, the rope is kept wound around the lowering device 40. This allows the distance between the balloon and the radiosonde 20 to be a predetermined distance. On the other hand, when the altitude of the balloon is equal to or higher than the predetermined altitude, the rope is unwound from the lowering device 40. This allows the distance between the balloon and the radiosonde 20 to be greater than the predetermined distance.

An internal structure of the second housing chamber S2 will be described next. The second housing chamber S2 houses a cover opening and closing mechanism 60 and a balloon detaching mechanism 70. A structure of the cover opening and closing mechanism 60 will be described first. The cover opening and closing mechanism 60 opens and closes the cover 12 with respect to the opening 11*a* of the case main body 11.

Note that there is no need to provide the cover opening and closing mechanism 60 when the cover 12 is omitted as described above. Although the cover opening and closing mechanism 60 opens and closes the cover 12 in this embodiment, an operator may open and close the cover 12 by hand. The cover opening and closing mechanism 60 can be omitted also in such a case.

The cover opening and closing mechanism 60 includes an actuator 61 and a rod 62. The actuator 61 is configured to move the rod 62 in the Z direction. Examples of the actuator 61 that can be employed may include an air cylinder and a hydraulic cylinder. The actuator 61 extends in the Z direction and passes through the bottom surface of the second housing chamber S2 (case main body 11).

A supply device for supplying fluid (air or oil) to the actuator 61 is disposed outside the canister 1. The supply device is connected to an end of the actuator 61 passing through the bottom surface of the second housing chamber S2 (case main body 11). Supplying a fluid to the actuator 61 from the supply device can drive the actuator 61 to move the rod 62 in the Z direction (upwardly or downwardly). When an air cylinder is employed as the actuator 61, air is used as the fluid. When a hydraulic cylinder is employed as the actuator 61, oil is used as the fluid.

The rod 62 extends upwardly (in the Z direction) from the actuator 61. One ends of linkage members 64 are connected to a tip of the rod 62 via an axial member 63*a*. The linkage members 64 can rotate about the axial member 63*a* relative to the tip of the rod 62. The other ends of the linkage members 64 are connected to a support portion 12*a* provided in the cover 12 via an axial member 63*b*. The linkage members 64 can rotate about the axial member 63*b* relative to the support portion 12*a*. The support portion 12*a* projects from the cover 12. The support portion 12*a* projects downwardly with the opening 11*a* being closed by the cover 12.

Figure 7:
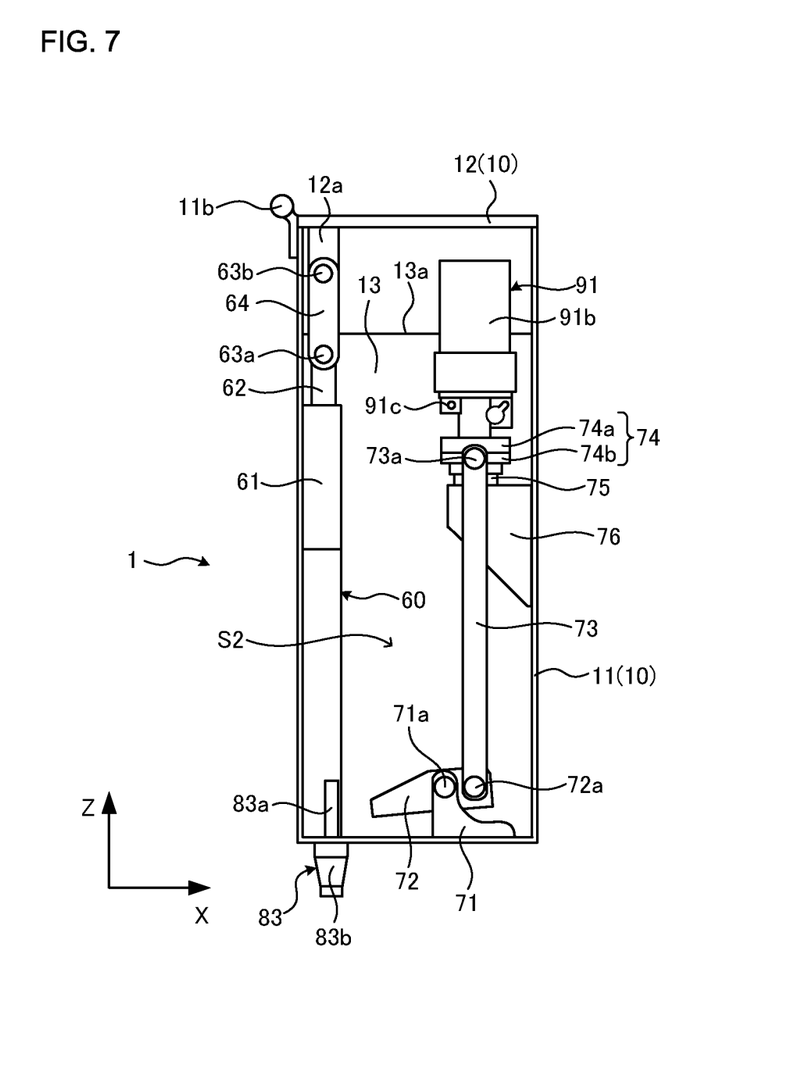
FIG. 7 is a side view of a second housing chamber illustrating a state in which a cover is closed.

FIG. 7 shows a state in which the cover 12 closes the opening 11*a*. FIG. 7 is a diagram (side view) of the second housing chamber S2 as viewed in the Y direction. In other words, FIG. 7 is a diagram of the second housing chamber S2 as viewed from the second partition plate 14 side toward the first partition plate 13 side.

When the actuator 61 is driven to move the rod 62 upwardly in the state shown in FIG. 7, the cover 12 moves upwardly via the linkage members 64 and the support portion 12*a*. This causes the cover 12 to rotate about the axial member 11*b*, thus opening the opening 11*a* and obtaining a state shown in FIG. 8. The provision of the linkage members 64 in this embodiment allows the cover 12 to rotate to a position for avoiding interference with the radiosonde 20 and the balloon described later as shown in FIG. 8.

Figure 8:
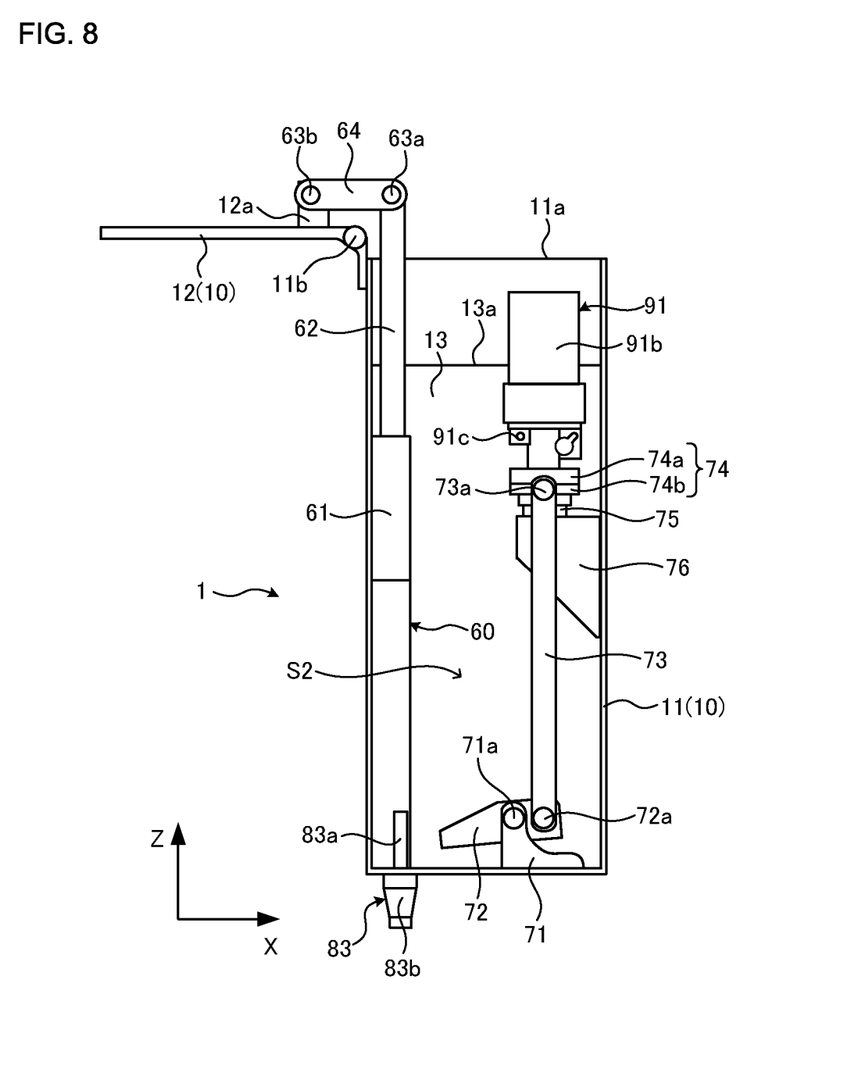
FIG. 8 is a side view of the second housing chamber illustrating a state in which the cover is opened.

On the other hand, when the actuator 61 is driven to move the rod 62 downwardly in the state shown in FIG. 8, the cover 12 moves downwardly via the linkage members 64 and the support portion 12*a*. This causes the cover 12 to rotate about the axial member 11*b*, thus closing the opening 11*a* and obtaining the state shown in FIG. 7. The cover 12 can be switched between the state shown in FIG. 7 and the state shown in FIG. 8 as described above.

Although an air cylinder or a hydraulic cylinder is employed as the actuator 61 in this embodiment, the actuator 61 is not limited thereto. More specifically, any actuator can be employed as the actuator 61 as long as the actuator 61 is capable of moving the rod 62 upwardly or downwardly. For example, a motor can be employed as the actuator 61. In such a case, the rotational motion of the motor can be converted into the rectilinear motion of the rod 62 in the Z direction by employing a rack and pinion mechanism.

Figure 9:
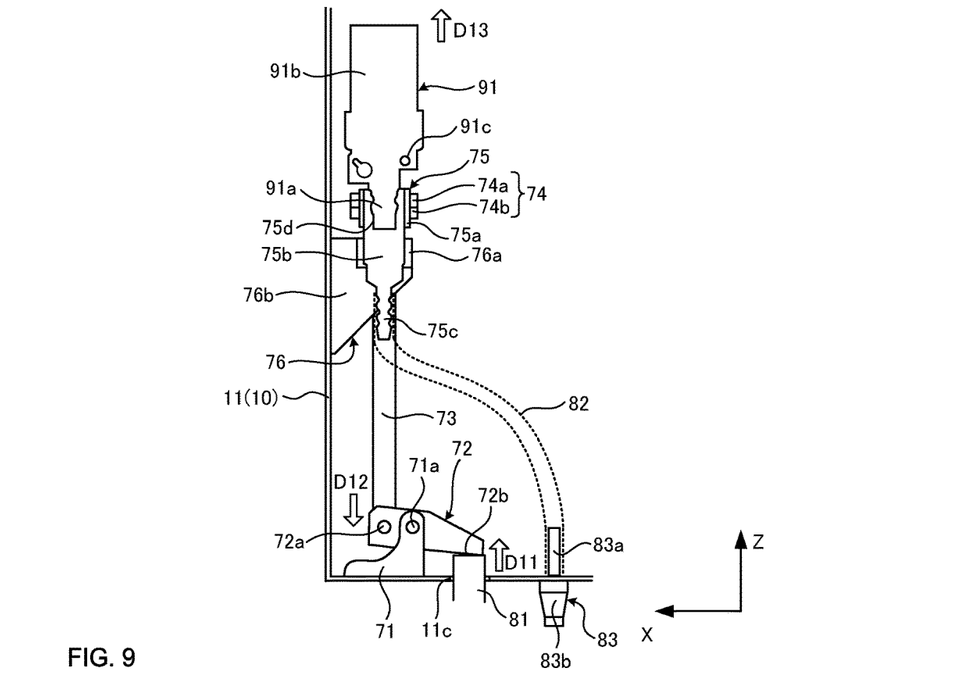
FIG. 9 is a diagram illustrating a structure of a balloon detaching mechanism.

A structure of the balloon detaching mechanism 70 will next be described mainly with reference to FIG. 9. FIG. 9 is a diagram corresponding to FIG. 7 and illustrates a cross section of the balloon detaching mechanism 70. The balloon detaching mechanism 70 is configured to detach the balloon from the canister 1 when the balloon is released into the atmosphere.

A fixing member 71 is fixed to the bottom surface of the second housing chamber S2 (case main body 11). The fixing member 71 is connected to a movable member 72 via an axial member 71*a*. The movable member 72 rotates about the axial member 71*a*.

An opening 11*c* is formed in the bottom surface of the second housing chamber S2 (case main body 11). The opening 11*c* is positioned below the movable member 72. A drive pin 81 is disposed inside the opening 11*c*. The drive pin 81 can move in the Z direction (upwardly or downwardly). An actuator (not shown) is connected to the drive pin 81. The drive pin 81 is configured to move in the Z direction by receiving power from the actuator.

The movable member 72 is connected to a pair of linkage members 73 via an axial member 72*a*. Specifically, lower ends of the pair of linkage members 73 are connected to respective both ends of the movable member 72 in the Y direction via the axial member 72*a* as shown in FIGS. 3 and 4.

Each of the linkage members 73 extends in the Z direction. Upper ends of the linkage members 73 are fixed to a holder 74 via a fixing pin 73*a*. The holder 74 is constituted by a pair of sub-holders 74*a* and 74*b*, and the sub-holders 74*a* and 74*b* are fixed to each other. Moreover, the pair of sub-holders 74*a* and 74*b* engage with a movable portion 75*a* of a coupler 75. Specifically, the pair of sub-holders 74*a* and 74*b* are disposed along an outer periphery of the movable portion 75*a* and interposes the movable portion 75*a* in the Z direction. The movable portion 75*a* of the coupler 75 is movable in the Z direction relative to a coupler main body 75*b*.

A lower end of the coupler main body 75*b* is provided with a male connecting portion 75*c*, and an upper end of the coupler main body 75*b* is provided with a female connecting portion 75*d*. The male connecting portion 75*c* is connected to a hose 82 by being inserted into one end of the hose 82. The other end of the hose 82 is connected to a gas nozzle 83 described later. A male connecting portion 91*a* formed in a mouthpiece 91 is inserted into the female connecting portion 75*d*.

When the movable portion 75*a* of the coupler 75 is at a connected position (shown in FIG. 9), the male connecting portion 91*a* of the mouthpiece 91 is connected to the female connecting portion 75*d* of the coupler 75. In contrast, the movable portion 75*a* can move downwardly from the connected position. When the movable portion 75*a* is moved to a released position located below the connected position, the male connecting portion 91a of the mouthpiece 91 can be removed from the female connecting portion 75d of the coupler 75. A mouth of the balloon is fixed to a fixing portion 91b of the mouthpiece 91.

Part of the coupler main body 75b positioned below the movable portion 75a is fixed to a support member 76. The support member 76 includes a fixing portion 76a and a frame portion 76b. The fixing portion 76a is fixed to the coupler main body 75b. The frame portion 76b supports the fixing portion 76a and part of the frame portion 76b is fixed to a side surface of the second housing chamber S2 (case main body 11). The provision of the support member 76 enables stable support of the coupler 75.

The mouthpiece 91 is provided with a fastening portion 91c. One end of the rope extending from the fastening portion 41 of the lowering device 40 is fixed to the fastening portion 91c.

Operations of the balloon detaching mechanism 70 will next be described.

Before the release of the balloon, the male connecting portion 91a of the mouthpiece 91 is connected to the female connecting portion 75d of the coupler 75. In addition, the drive pin 81 is separated from an actuating portion 72b of the movable member 72.

When the drive pin 81 is moved upwardly, a tip of the drive pin 81 pushes the actuating portion 72b of the movable member 72 upwardly (direction of an arrow D11 shown in FIG. 9). This causes the movable member 72 to rotate about the axial member 71a. Along with the rotation of the movable member 72, the axial member 72a moves downwardly (direction of an arrow D12 shown in FIG. 9) and the linkage members 73 move downwardly. Since the linkage members 73 are fixed to the holder 74, the holder 74 also moves downwardly along with the downward movement of the linkage members 73.

The movable portion 75a of the coupler 75 moves downwardly along with the downward movement of the holder 74. This can cause the movable portion 75a to move from the connected position to the released position, thereby removing the male connecting portion 91a of the mouthpiece 91 from the female connecting portion 75d of the coupler 75. When the balloon is inflated by filling the balloon fixed to the mouthpiece 91 with a gas which will be described later, the mouthpiece 91 moves upwardly (direction of an arrow D13 shown in FIG. 9) and is thus separated from the coupler 75 as the balloon ascends. In this manner, the balloon is detached from the canister 1.

The gas nozzle 83 is fixed to the bottom surface of the second housing chamber S2 (case main body 11). The gas nozzle 83 passes through the bottom surface of the second housing chamber S2 (case main body 11) with an upper end 83a of the gas nozzle 83 being disposed in the second housing chamber S2 and a lower end 83b of the gas nozzle 83 being disposed outside the case main body 11.

The upper end 83a of the gas nozzle 83 is connected to the other end of the hose 82. The gas nozzle 83 is thus connected to the male connecting portion 75c of the coupler 75 via the hose 82. The lower end 83b of the gas nozzle 83 is connected to a gas cylinder (not shown) via a gas supply pipe (not shown). The gas cylinder contains a gas for inflating the balloon.

The gas contained in the gas cylinder is introduced into the coupler 75 after moving through the gas supply pipe and then moving through a gas passage formed inside the gas nozzle 83 and the hose 82. Thereafter, the gas moves through a gas passage formed inside the coupler 75 and a gas passage formed inside the mouthpiece 91, and then moves into the balloon. This can inflate the balloon. The gas filled into the balloon is a gas having a specific gravity smaller than that of air. Examples of such a gas that can be employed may include a hydrogen gas and a helium gas. The balloon can be made of an elastic material.

Figure 10:
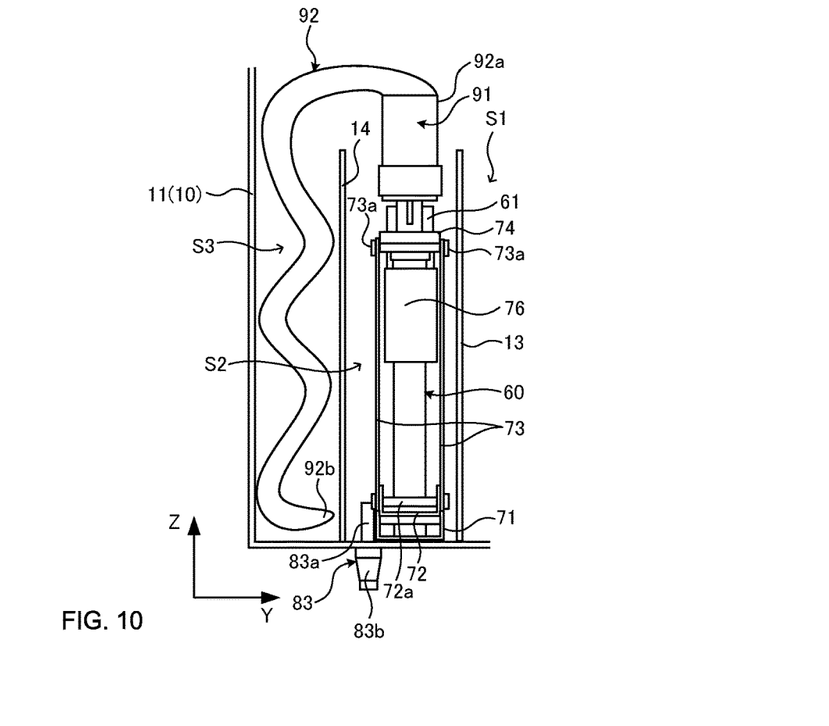
FIG. 10 is a diagram illustrating a state in which a balloon is housed.

An internal structure of the third housing chamber S3 will be described next. As shown in FIG. 10, the third housing chamber S3 houses part of a balloon 92.

A mouth 92a of the balloon 92 is fixed to the fixing portion 91b of the mouthpiece 91. The balloon 92 is led into the third housing chamber S3 after passing through a space above the second partition plate 14. The balloon 92 is folded in the third housing chamber S3, and a tip 92b of the balloon 92 is present at the lowest position in the third housing chamber S3.

Housing the balloon 92 in the third housing chamber S3 as shown in FIG. 10 facilitates the inflation of the balloon 92 when the gas is filled into the balloon 92. This will be described below.

Figure 11:
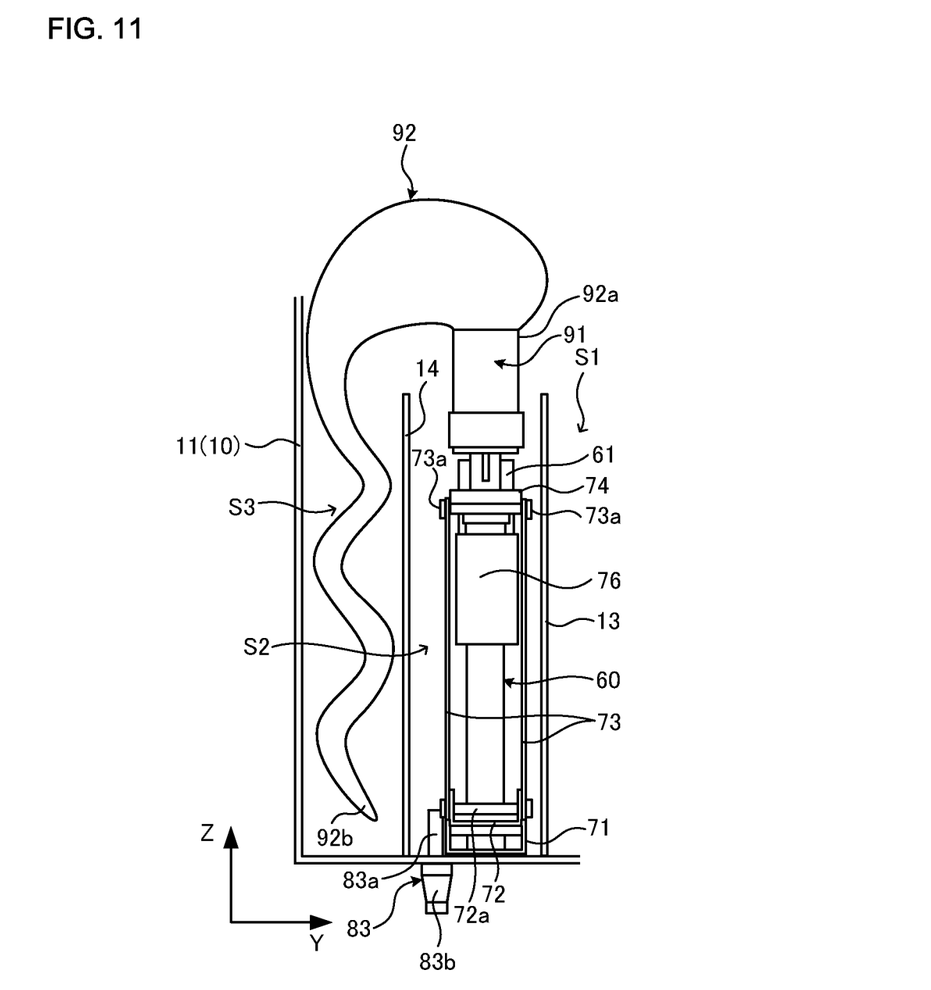
FIG. 11 is a diagram illustrating a state in which the balloon starts to inflate.

When the gas is filled into the balloon 92 from the mouthpiece 91, the gas moves upwardly due to its specific gravity smaller than that of air. Thus, a portion of the balloon 92 adjacent to the mouthpiece 91 is inflated by the gas filling. If the gas filling continues, the balloon 92 continues to inflate above the mouthpiece 91 as shown in FIG. 11. The inflation of the balloon 92 causes a portion (uninflated portion) of the balloon 92 housed in the third housing chamber S3 to lift upwardly. In this manner, the uninflated portion of the balloon 92 can smoothly move to the outside of the third housing chamber S3.

If the balloon 92 started to inflate from a portion located in a lower part of the third housing chamber S3, the inflated portion would be in tightly contact with an inner wall surface of the third housing chamber S3. In this case, frictional resistance between the inflated portion of the balloon 92 and the third housing chamber S3 prevents the balloon 92 from ascending. Moreover, the friction between the balloon 92 and the third housing chamber S3 may damage the balloon 92. When the balloon 92 starts to inflate from a portion located in an upper part of the third housing chamber S3 as in this embodiment, the inflated portion can be prevented from being in tightly contact with the inner wall surface of the third housing chamber S3. The balloon 92 can thus ascend smoothly.

At the same time, the second housing chamber S2 and the third housing chamber S3 are separated from each other in this embodiment. The balloon 92 can thus be prevented from interfering with the members (such as the cover opening and closing mechanism 60 and the balloon detaching mechanism 70) disposed in the second housing chamber S2 when the balloon 92 is inflated.

In this embodiment, disposing the balloon detaching mechanism 70 in the second housing chamber S2 allows the balloon 92 to inflate above the second housing chamber S2 as shown in FIG. 11. Moreover, housing the radiosonde 20 in the first housing chamber S1, which is adjacent to the second housing chamber S2, allows the radiosonde 20 and the balloon 92 to ascend smoothly with the radiosonde 20 being close to the balloon 92. This will be specifically described below.

Figure 12:
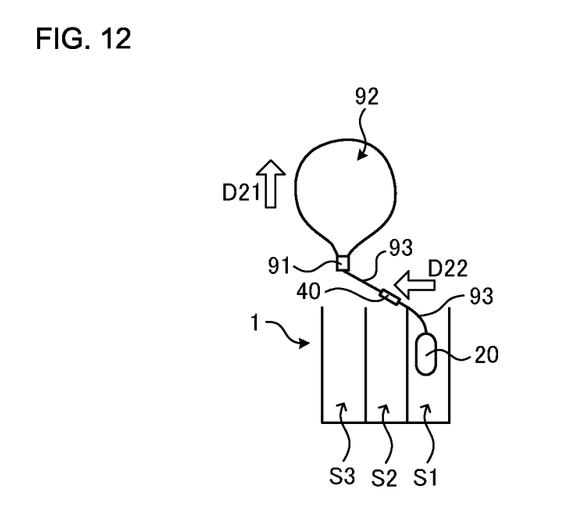
FIG. 12 is a diagram for explaining the movement of the radiosonde along with the ascending of the balloon in a comparative example.

A case where the balloon detaching mechanism 70 is disposed in the third housing chamber S3 and the balloon 92 is housed in the second housing chamber S2 will now be discussed. In this case, the balloon 92 inflates above the third housing chamber S3 and moves toward directly above the third housing chamber S3. The radiosonde 20 is connected to the balloon 92 by a rope 93. When the balloon 92 ascends in the direction of an arrow D21 as shown in FIG. 12, the radiosonde 20 housed in the first housing chamber S1 is pulled toward the third housing chamber S3 as indicated by an arrow D22, making it difficult to move upwardly. Thus, the radiosonde 20 cannot ascend smoothly.

In the configuration shown in FIG. 12, the radiosonde 20 may be pulled in the direction of the arrow D22 until just before the radiosonde 20 is moved to the outside of the first housing chamber S1. In such a case, the radiosonde 20 swings by receiving acting force in the direction of the arrow D22 after the radiosonde 20 is moved to the outside of the first housing chamber S1. The swing of the radiosonde 20 leads to the swing of the balloon 92. Thus, the balloon 92 and the radiosonde 20 cannot ascend in a stable manner.

Figure 13:
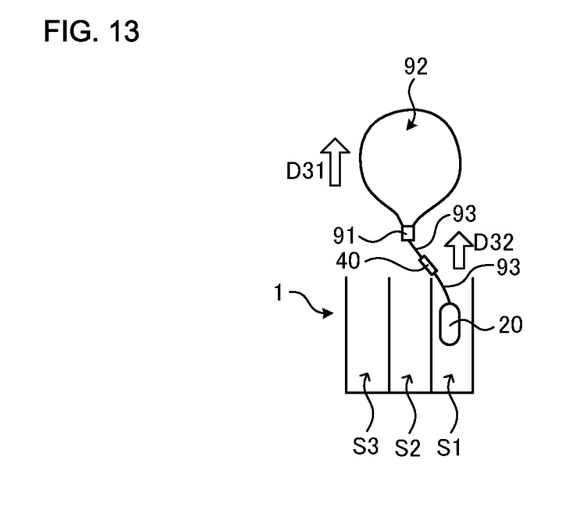
FIG. 13 is a diagram for explaining the movement of the radiosonde along with the ascending of the balloon in this embodiment.

In this embodiment, the balloon 92 inflates above the second housing chamber S2 and the balloon 92 moves toward directly above the second housing chamber S2. Since the radiosonde 20 is housed in the first housing chamber S1 adjacent to the second housing chamber S2, the radiosonde 20 is more likely to be pulled upwardly as indicated by an arrow D32 when the balloon 92 ascends in the direction of an arrow D31 as shown in FIG. 13. The radiosonde 20 can thus ascend smoothly.

Smooth ascending of the radiosonde 20 can prevent the radiosonde 20 having moved to the outside of the first housing chamber S1 from swinging as in the configuration shown in FIG. 12. This facilitates stable ascending of the balloon 92 and the radiosonde 20.

Figure 14:
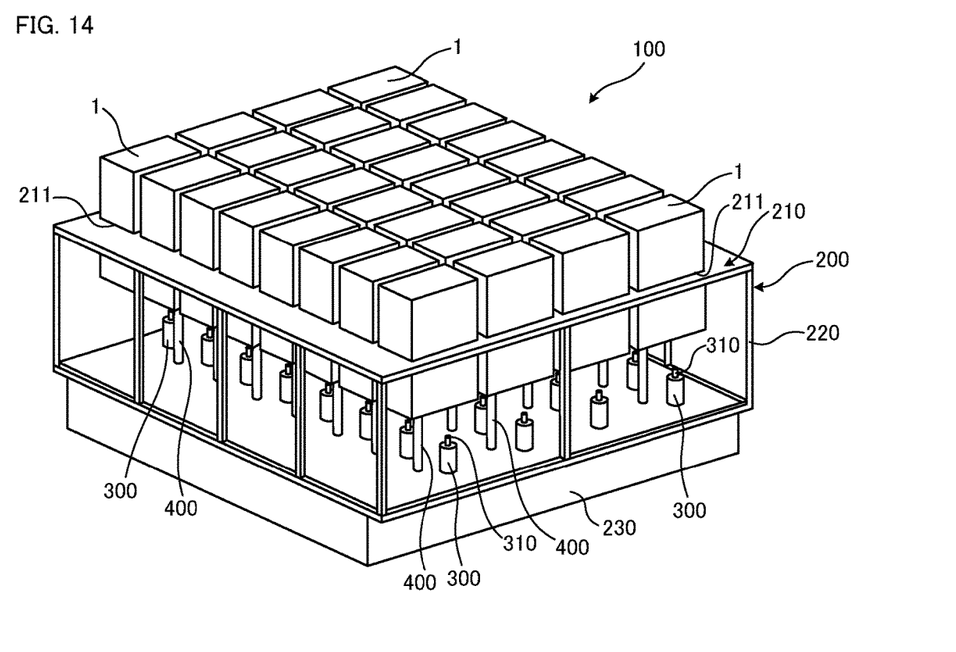
FIG. 14 is a perspective view of a canister module.
Figure 15:
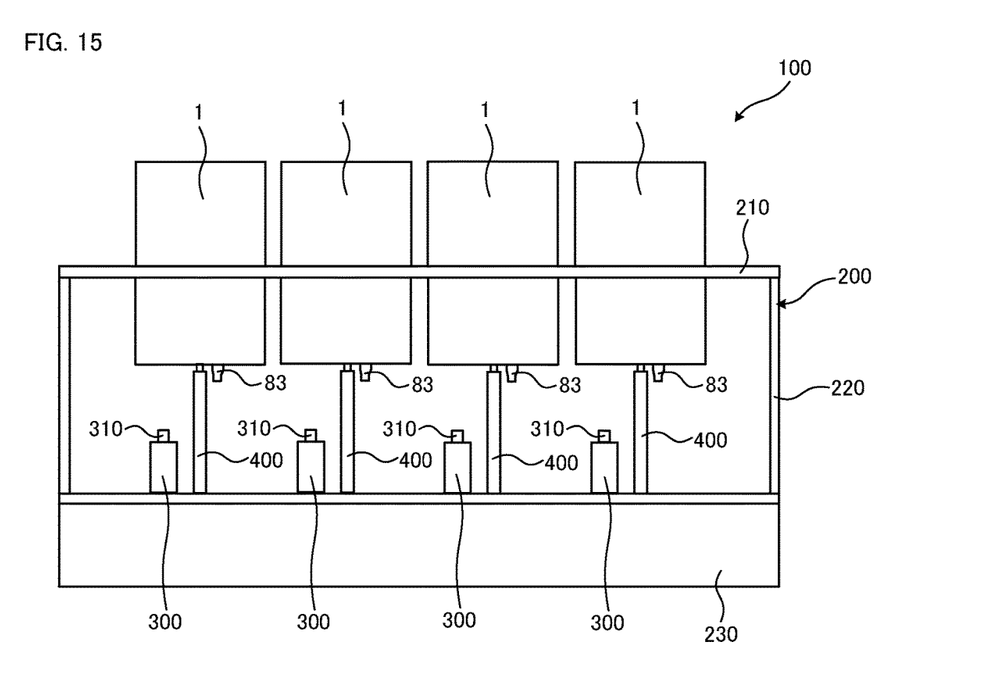
FIG. 15 is a side view of the canister module.

A balloon-launching device configured to release the balloon 92 can be constituted by one or more canisters 1. When a plurality of canisters 1 are employed, a canister module 100 can be constituted as shown in FIGS. 14 and 15. FIG. 14 is a perspective view of the canister module 100, and FIG. 15 is a side view of the canister module 100.

In the canister module 100, a plurality of canisters 1 are arranged in a matrix within a horizontal plane. Here, the number of the canisters 1 can be appropriately selected. Although the plurality of canisters 1 are arranged in a matrix in the canister module 100 shown in FIG. 14, the arrangement of the plurality of canisters 1 is not limited thereto. In other words, it is only required to arrange the plurality of canisters 1 within a horizontal plane and the arrangement of the plurality of canisters 1 can be determined as appropriate.

The canister module 100 includes a canister holder 200 configured to hold the plurality of canisters 1. The canister holder 200 includes: a fixing plate 210 to which the canisters 1 are fixed; a frame 220 disposed below the fixing plate 210; and a base 230.

Openings 211 for the canisters 1 to pass through are formed in the fixing plate 210. In this embodiment, the openings 211 are formed corresponding to the number of the canisters 1. Note that the plurality of canisters 1 may be disposed inside a single opening 211.

The frame 220 is provided between the fixing plate 210 and the base 230. The canisters 1 are disposed at positions above and distant from the base 230. Gas supply valves 300 and supply pipes 400 are disposed on the base 230. Gas nozzles 310 are provided on upper end faces of the gas supply valves 300, and a hose (not shown) is connected to the gas nozzle 310 and the gas nozzle 83 of the canister 1. The gas supply valve 300 is configured to control the amount of the gas supplied to the gas nozzle 83 of the canister 1. The supply pipe 400 is used to supply a fluid (air or oil) to the actuator 61 of the canister 1. The supply pipe 400 is connected to the actuator 61 of the canister 1.

The use of the canister module 100 allows a plurality of balloons 92 to be released from a plurality of canisters 1.

Moreover, the plurality of canisters 1 can be arranged together in the canister module 100. Thus, the size of the balloon-launching device can be reduced as compared to a case where a plurality of balloons are arranged on an annular turntable as in the conventional technique (Patent Literature 1). In the annular turntable, a central portion of the turntable is left as dead space. However, in the canister module 100, the plurality of canisters 1 can be arranged adjacent to one another, thus being less likely to create dead space. Therefore, the canister module 100 can be downsized in this embodiment.

REFERENCE SIGNS LIST 1 canister
10 case
20 radiosonde
70 balloon detaching mechanism
83 gas nozzle
92 balloon
S1 first housing chamber
S2 second housing chamber
S3 third housing chamber

The invention claimed is:

1. A canister for housing a balloon and a radiosonde to be released into the atmosphere, the canister comprising:
   a case including a first housing chamber, a second housing chamber, and a third housing chamber arranged side by side in a horizontal direction, the first housing chamber, the second housing chamber, and the third housing chamber being in communication with one another in an upper part of the case;
   a balloon detaching mechanism that is provided in the second housing chamber, is connected to the balloon, and is configured to detach the balloon when the balloon is released; and
   a gas passage that is provided in the second housing chamber and is configured to introduce a gas into the balloon,
   wherein the second housing chamber is disposed between the first housing chamber and the third housing chamber,
   the first housing chamber houses the radiosonde connected to the balloon via a rope, and
   the third housing chamber houses part of the balloon connected to the balloon detaching mechanism.

2. The canister according to claim 1, wherein the part of the balloon is housed from an upper part of the third housing chamber toward a lower part thereof in a state where the part of the balloon is folded in a vertical direction.

3. The canister according to claim 1, wherein the gas passage includes a coupler that can be connected to a mouthpiece provided in a mouth of the balloon and includes a movable member configured to move between a connected position for connecting the mouthpiece to the coupler and a released position for releasing connection between the mouthpiece and the coupler, and
   the balloon detaching mechanism includes a linkage member connected to the movable member of the coupler, the linkage member moving the movable member between the connected position and the released position.

4. The canister according to claim 1, wherein the case includes:
   a case main body for forming the first housing chamber, the second housing chamber, and the third housing chamber; and a cover for opening and closing an opening formed in an upper part of the case main body.

5. The canister according to claim 4, comprising a cover opening and closing mechanism for opening and closing the cover, the cover opening and closing mechanism being housed in the second housing chamber,
 wherein the cover opening and closing mechanism includes:
  a rod connected to the cover; and
  an actuator configured to move the rod in the vertical direction.

6. The canister according to claim 1, wherein the case include a guide portion extending in the vertical direction in an inner wall surface of the first housing chamber, the guide portion guiding ascending of the radiosonde.

7. A canister module comprising a plurality of the canister according to claim 1, wherein the plurality of the canisters are arranged within a horizontal plane.

* * * * *